(12) United States Patent
Kim

(10) Patent No.: US 8,019,984 B2
(45) Date of Patent: Sep. 13, 2011

(54) METHOD FOR CONTROLLING AUTOSTART OF DATA APPLICATION AND VIDEO PLAYBACK APPARATUS THEREOF

(75) Inventor: Moon-Soo Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1104 days.

(21) Appl. No.: 11/783,168

(22) Filed: Apr. 6, 2007

(65) Prior Publication Data

US 2008/0063354 A1 Mar. 13, 2008

(30) Foreign Application Priority Data

Sep. 11, 2006 (KR) ........................ 10-2006-0087702

(51) Int. Cl.
G06F 9/00 (2006.01)
G06F 3/00 (2006.01)
H04N 7/16 (2006.01)

(52) U.S. Cl. .................... 713/2; 713/1; 725/25; 725/27; 725/38

(58) Field of Classification Search .................. 713/1, 2; 725/25, 27, 38
See application file for complete search history.

(56) References Cited

U.S. PATENT DOCUMENTS

| | | | | |
|---|---|---|---|---|
| 5,210,611 A * | 5/1993 | Yee et al. | ...................... | 348/473 |
| 6,075,526 A * | 6/2000 | Rothmuller | ................... | 715/721 |
| 6,115,079 A * | 9/2000 | McRae | ........................ | 348/731 |
| 6,198,513 B1 * | 3/2001 | Cherrick | ...................... | 348/731 |
| 6,321,381 B1 * | 11/2001 | Yuen et al. | ...................... | 725/28 |
| 6,721,953 B1 * | 4/2004 | Bates et al. | ...................... | 725/39 |
| 6,785,901 B1 * | 8/2004 | Horiwitz et al. | ................. | 725/25 |
| 7,120,922 B2 * | 10/2006 | Rodriguez et al. | .............. | 725/39 |
| 7,185,355 B1 * | 2/2007 | Ellis et al. | ........................ | 725/46 |
| 7,600,239 B2 * | 10/2009 | De Lange et al. | ................ | 725/36 |
| 7,690,012 B2 * | 3/2010 | Luehrs | ............................ | 725/28 |
| 2002/0056098 A1 * | 5/2002 | White | .............................. | 725/39 |
| 2002/0059610 A1 * | 5/2002 | Ellis | ................................ | 725/58 |
| 2002/0175953 A1 * | 11/2002 | Lin | ................................ | 345/811 |
| 2002/0194600 A1 * | 12/2002 | Ellis et al. | ........................ | 725/41 |
| 2003/0079227 A1 * | 4/2003 | Knowles et al. | ................. | 725/50 |
| 2003/0084448 A1 * | 5/2003 | Soundararajan | ................ | 725/46 |
| 2003/0154479 A1 * | 8/2003 | Brenner et al. | ................... | 725/40 |
| 2004/0019907 A1 * | 1/2004 | Li et al. | ........................... | 725/46 |
| 2005/0251822 A1 * | 11/2005 | Knowles et al. | ................ | 725/39 |
| 2006/0143648 A1 * | 6/2006 | Shinokawa | ..................... | 725/25 |
| 2006/0164562 A1 * | 7/2006 | Robertson | ..................... | 348/731 |
| 2008/0098443 A1 * | 4/2008 | Gan et al. | ...................... | 725/100 |

FOREIGN PATENT DOCUMENTS

| | | |
|---|---|---|
| CN | 1722822 A | 1/2006 |
| EP | 1551175 A1 | 7/2005 |
| KR | 10-2000-0075385 A | 12/2000 |
| KR | 2002-0035577 A | 5/2002 |
| WO | 2006008674 A2 | 1/2006 |

* cited by examiner

Primary Examiner — Vincent T Tran
(74) Attorney, Agent, or Firm — Sughrue Mion, PLLC

(57) ABSTRACT

A method for controlling an autostart of a data application and a video playback apparatus thereof are provided. The method for controlling an autostart of a data application includes determining stored setup information of a start procedure of the data application, and executing the data application according to the determined setup information of the start method of the data application. Therefore, it is possible to prevent the data application from being automatically started unintentionally, and only the required data application can be automatically started by user control, and accordingly, user convenience is enhanced.

20 Claims, 4 Drawing Sheets

| CHANNEL | APPLICATION NAME | START METHOD |
|---|---|---|
| 127-1 | EPG | DISABLED |
| | WEATHER | DISABLED |
| 128-1 | EDUCATION | MANUALLY ▼ |
| 129-1 | TRAFFIC | AUTOMATICALLY ▼ |

FIG. 3
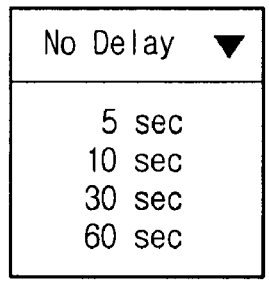
FIG. 4
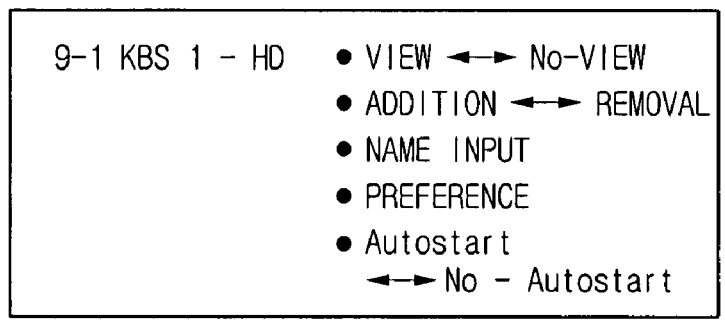
FIG. 5
| CHANNEL | APPLICATION NAME | START METHOD |
|---|---|---|
| 127-1 | EPG | DISABLED |
| | WEATHER | DISABLED |
| 128-1 | EDUCATION | MANUALLY |
| 129-1 | TRAFFIC | AUTOMATICALLY |

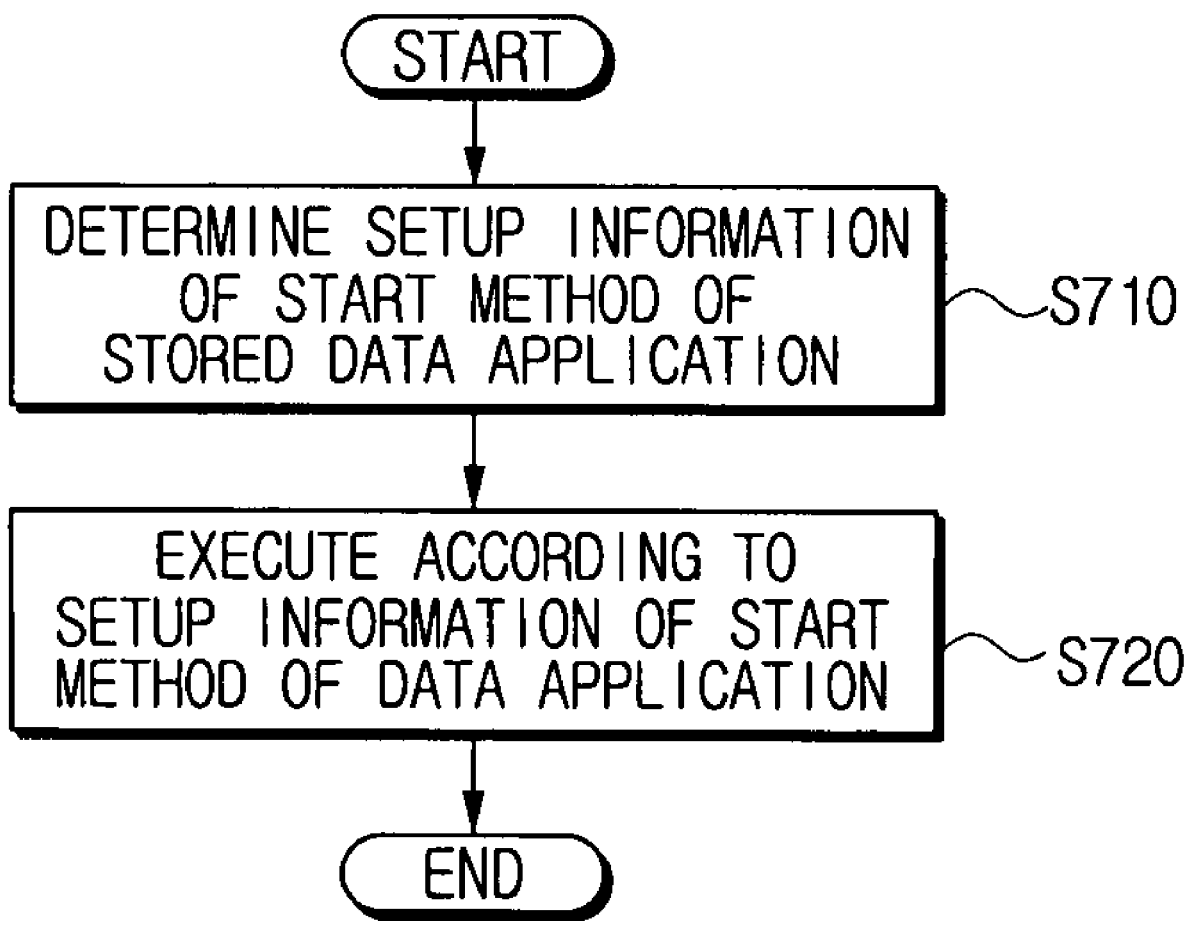

METHOD FOR CONTROLLING AUTOSTART OF DATA APPLICATION AND VIDEO PLAYBACK APPARATUS THEREOF

CROSS-REFERENCE TO RELATED APPLICATIONS

This application claims priority under 35 U.S.C. §119 from Korean Patent Application No. 10-2006-0087702 filed on Sep. 11, 2006, in the Korean Intellectual Property Office, the disclosure of which is incorporated herein by reference in its entirety.

BACKGROUND OF THE INVENTION

1. Field of the Invention

Apparatuses and methods consistent with the present invention relate to controlling an autostart of a data application and video playing back, and more particularly, to controlling an autostart of a data application in a video playback apparatus in order to provide various services.

2. Description of the Related Art

Video playback apparatuses display video received from an external source through antennas, and examples thereof generally include televisions (TVs), set-top boxes, personal computers (PCs), and the like.

Recently, not only video, but also various multimedia data services have been provided by video playback apparatuses which support Advanced Common Application Platform (ACAP)/Open Cable Application Platform (OCAP). Such data services comprise services which provide information regarding programs currently being broadcast, such as information related to sports broadcasting, additional information regarding drama broadcasting or the like; services which provide individual information not related to the program currently broadcast, such as real-time news, weather information, stock quotations, traffic conditions or the like; and a bi-directional service, such as a public-opinion poll, audience research or the like. Video playback apparatuses execute data applications related to each data service received through an antenna to provide data services corresponding to the data application.

FIG. 1 is a flowchart illustrating a data application autostart method according to an exemplary embodiment of the conventional invention.

In FIG. 1, a conventional video playback apparatus tunes to a channel selected by a user and receives a transport stream in operation S110. The video playback apparatus parses an Application Information Table (AIT) comprising data application information in an MPEG (Moving Picture Experts Group) section of the received transport stream in operation S120, or the video playback apparatus parses an Extended AIT (XAIT).

The video playback apparatus confirms an autostart flag of the parsed AIT and determines whether the autostart is set in operation S130. Specifically, if the autostart flag is 1, the video playback apparatus determines that the data application received from the transport stream is set to autostart.

If it is determined that the autostart is set in operation S130-Y, the video playback apparatus executes the data application in operation S140. In other words, the received data application is automatically executed in the conventional video playback apparatus.

Therefore, there is no method for not executing the data application broadcasted with the autostart on the user-selected channel. In particular, if a channel changes regularly after a predetermined time period, the data application received through the changed channel for every channel change is automatically executed, causing a user inconvenience. Additionally, data application that is not used is automatically executed and utilizes resources of the apparatus, and thus resources are unnecessarily wasted.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method for controlling an autostart of a data application and a video playback apparatus thereof in which the data application is executed according to whether the autostart is enabled by a user.

The present invention also provides a method for controlling an autostart of a data application and a video playback apparatus thereof which executes the data application after a delay period.

In one exemplary embodiment of the present invention, there is provided a method for controlling an autostart of a data application, comprising determining stored setup information of a start method of the data application, and executing the data application according to the determined setup information of the start method of the data application.

The determining may comprise determining whether the received data application exists in a previously stored data application list, and confirming the setup information of the start method of the data application based on the previously stored data application list if it is determined that the received data application exists in the previously stored data application list.

Additionally, the executing may comprise executing the data application manually or automatically according to the setup information of the start method of the data application.

The executing may comprise not executing the autostart for all the data applications received on the selected channel according to the setup information of the start method of the data application.

The executing may comprise executing the autostart for each data application received on the selected channel according to the setup information of the start method of the data application.

The executing may comprise executing the data application according to the setup information of the start method of the data application even if an autostart flag is not present in the received data application.

The method may further comprise storing the received data application in the previously stored data application list if it is determined that the received data application does not exist in the previously stored data application list, and executing the received data application according to an autostart flag value of the received data application.

A data application which is not continuously received may be deleted from the previously stored data application list containing the data applications.

Additionally, the previously stored data application list may be updated if information regarding the received data application changes.

The method may further comprise delaying execution of the data application.

Specifically, the delaying may be performed so as not to parse the data application information for the execution of the data application for a set delay period.

The delaying the execution of the data application may be conducted for a length of time set by a user.

According to another aspect of the prevent invention, there is provided a video playback apparatus comprising a receiver which receives a data application received on a selected channel, and a controller which determines stored setup information of a start method of the received data application and executes the data application according to the determined setup information of the start method of the data application.

The controller may determine whether the received data application exists in a previously stored data application list, and confirm the setup information of the start method of the data application based on the previously stored data application list if it is determined that the received data application exists in the previously stored data application list.

The controller may execute the data application manually or automatically according to the setup information of the start method of the data application.

The controller may not execute the autostart for all the data applications received on the selected channel according to the setup information of the start method of the data application.

The controller may execute the autostart for each data application received on the selected channel according to the setup information of the start method of the data application.

The controller may execute the data application according to the setup information of the start method of the data application even if an autostart flag is not present in the received data application.

The controller may store the received data application in the previously stored data application list if it is determined that the received data application does not exist in the previously stored data application list, and execute the received data application according to an autostart flag value of the received data application.

The controller may delete a data application which is not continuously received, from the previously stored data application list containing the data applications.

Additionally, the controller may update the previously stored data application list if information regarding the received data application changes.

The controller may control the data application information for the execution of the data application not to be parsed for a set delay period.

The video playback apparatus may further comprise a decoder which decodes the data application information, and a parser which parses the decoded data application information.

The controller may control the decoder not to output the data application information to the parser for the set delay period.

BRIEF DESCRIPTION OF THE DRAWINGS

The above and/or other aspects of the present invention will be more apparent by describing certain exemplary embodiments of the present invention with reference to the accompanying drawings, in which:

FIG. 3 is a view illustrating an interface to set a delay period for the start of data services in a method for controlling an autostart of a data application according to an exemplary embodiment of the present invention;

FIG. 4 is a view illustrating a menu comprising an interface to regulate an autostart of a data application for each channel in a method for controlling an autostart of a data application according to an exemplary embodiment of the present invention;

FIG. 5 is a view illustrating a data application list comprising an interface to regulate an autostart for each data application in a method for controlling an autostart of a data application according to an exemplary embodiment of the present invention;

FIG. 7 is a flowchart illustrating a method for controlling an autostart of a data application of a video playback apparatus according to another exemplary embodiment of the present invention.

Throughout the drawings, the same drawing reference numerals will be understood to refer to the same elements, features and structures.

DETAILED DESCRIPTION OF THE EXEMPLARY EMBODIMENTS

Figure 1:
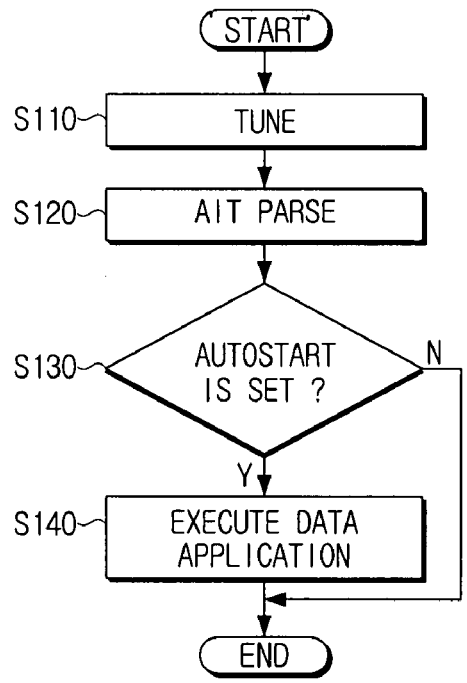
FIG. 1 is a flowchart illustrating a data application autostart method according to an exemplary embodiment of a conventional invention.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

Figure 2:
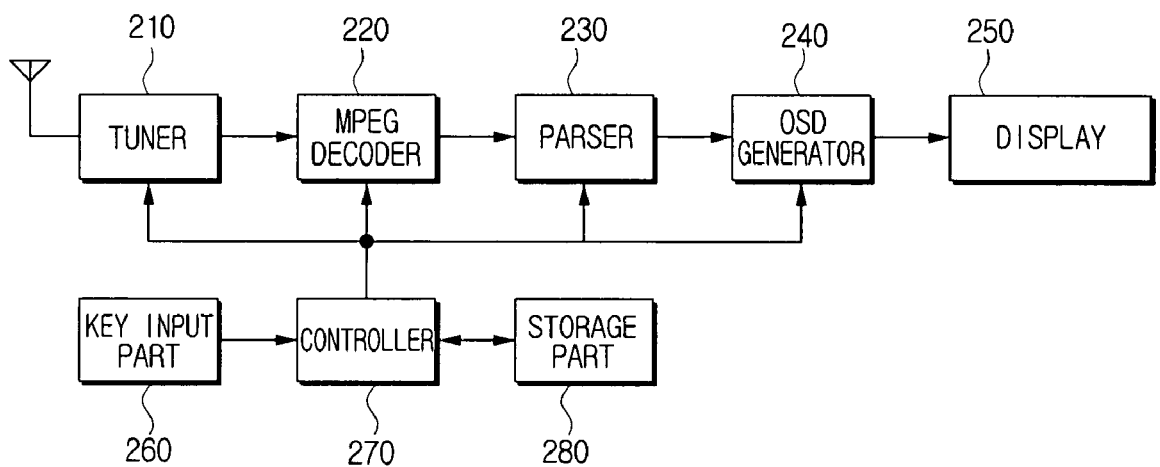
FIG. 2 is a block diagram of a video playback apparatus according to an exemplary embodiment of the present invention.

FIG. 2 is a block diagram of a video playback apparatus according to an exemplary embodiment of the present invention.

The present video playback apparatus executes a received data application after a delay period according to the control of a user, and executes a data application according to whether autostart is enabled by a user.

In FIG. 2, the present video playback apparatus comprises a tuner 210, an MPEG (Moving Picture Experts Group) decoder 220, a parser 230, an on screen display (OSD) generator 240, a display 250, a key input part 260, a controller 270, and a storage part 280.

The tuner 210 receives a transport stream of a channel selected by a user. The MPEG decoder 220 decodes compressed data contained in the transport stream received by the tuner 210. The parser 230 parses data application information, such as AIT and XAIT, decoded by the MPEG decoder 220.

The OSD generator 240 generates a graphical interface to set a delay period of a data application autostart, that is, a delay period setting menu and a menu to regulate a data application autostart.

The display 250 displays the menu generated by the OSD generator 240. The key input part 260 comprises a key for setting a delay period of a data application autostart and a key for controlling a data application autostart.

The controller 270 controls the parser 230 not to parse the data application information decoded by the MPEG decoder 220 for the delay period of the data application autostart. At this time, the delay period is set by the key input part 260.

After the set delay period of the data application autostart has elapsed, the controller 270 controls the parser 230 to parse the data application information decoded by the MPEG decoder 220, and determines whether the data application pertaining to the parsed data application information is executed according to whether the autostart is enabled by the key input part 260.

The storage part 280 stores a previously stored data application list.

The above description is related to the present video playback apparatus comprising the tuner 210, MPEG decoder 220, parser 230, OSD generator 240, display 250, key input part 260, controller 270, and storage part 280, but it is only one exemplary embodiment. The video playback apparatus can be implemented as a receiving means for receiving the data application received on the selected channel and a control means for determining stored setup information of a start procedure of the received data application and executing the data application according to the determined setup information of the start procedure of the data application.

FIG. 3 is a view illustrating an interface to set a delay period for the start of data services in a method for controlling an autostart of a data application according to an exemplary embodiment of the present invention.

The interface capable of setting the delay period of the autostart, that is, a delay period setting menu is shown in FIG. 3. Here, the interface enables all data applications received on the channel selected by the user to be executed after a predetermined time period, such as 5, 10, 30 and 60 seconds, has elapsed, not to be executed immediately upon being received.

The OSD generator 240 generates the delay period setting menu under the control of the controller 270, and displays the menu on the display 250. If a user sets the delay period, for example, at 30 seconds, from the displayed delay period setting menu through the key input part 260, the controller 270 controls the parser 230 not to parse the data application information decoded by the MPEG decoder 220 for 30 seconds. Alternatively, the controller 270 may control the MPEG decoder 220 not to output the decoded data application information to the parser 230.

This prevents the data application from being automatically started upon being received as soon as the channel changes, if the user determines whether a program currently being broadcast is a desired program and whether he or she wants to view the program for the predetermined time period without an immediate channel change, and then changes to another channel.

FIG. 4 is a view illustrating a menu comprising an interface to regulate the autostart of a data application for each channel in a method for controlling an autostart of a data application according to an exemplary embodiment of the present invention.

As illustrated in FIG. 4, the menu for each channel comprises an interface which may regulate all the data applications received on one channel, for example a 9-1 channel, so they are not automatically executed.

The menu of the 9-1 channel comprises a view/no-view selection interface, a channel addition/removal selection interface, a channel name input interface, a preference setting interface, and an interface to regulate the autostart/no-autostart of the data application.

The OSD generator 240 generates the menu for each channel under the control of the controller 270, and displays the menu on the display 250. If a user regulates the data application to be set to no-autostart using the interface to regulate the autostart/no-autostart of the data application from the displayed menu for each channel through the key input part 260, the controller 270 does not execute all the data applications received on the 9-1 channel.

FIG. 5 is a view illustrating a data application list comprising an interface to regulate an autostart for each data application in a method for controlling an autostart of a data application according to an exemplary embodiment of the present invention.

FIG. 5 shows the previously stored data application list which comprises the interface capable of controlling the autostart for each received data application. The previously stored data application list comprises a channel number, a name of the received data application, and an interface to regulate a data application start method.

The autostart of the data application is regulated as follows. For example, an electronic program guide (EPG) data application and a weather data application are received on a 127-1 channel, and the autostart of two data applications is disabled. An education data application being received on a 128-1 channel is manually started, and a traffic data application being received on a 129-1 channel is automatically started.

The controller 270 generates a data application list comprising information regarding the name and information to set the start procedure of the received data application for each channel whenever the channel changes, and stores the data application list in the storage part 280. If a user regulates the data application to be set to no-autostart in the interface to regulate the data application start procedure from the data application list through the key input part 260, the controller 270 allows the received data application to be started according to the regulated start method. For example, the traffic data application on the 129-1 channel is regulated to be manually started. Therefore, if the current channel changes to the 129-1 channel, the controller 270 allows the traffic data application to be started if a user wants to start the traffic data application manually.

The controller 270 updates the data application list stored in the storage part 280 every time the information regarding the received data application changes. If the data application being received on the specific channel is not continuously received, the controller 270 deletes the data application from the data application list stored in the storage part 280.

Accordingly, an interface capable of controlling the autostart for each data application is provided, and thus it is possible to also regulate the data application to be automatically or manually started even though an autostart flag is not present in the data application.

Figure 6:
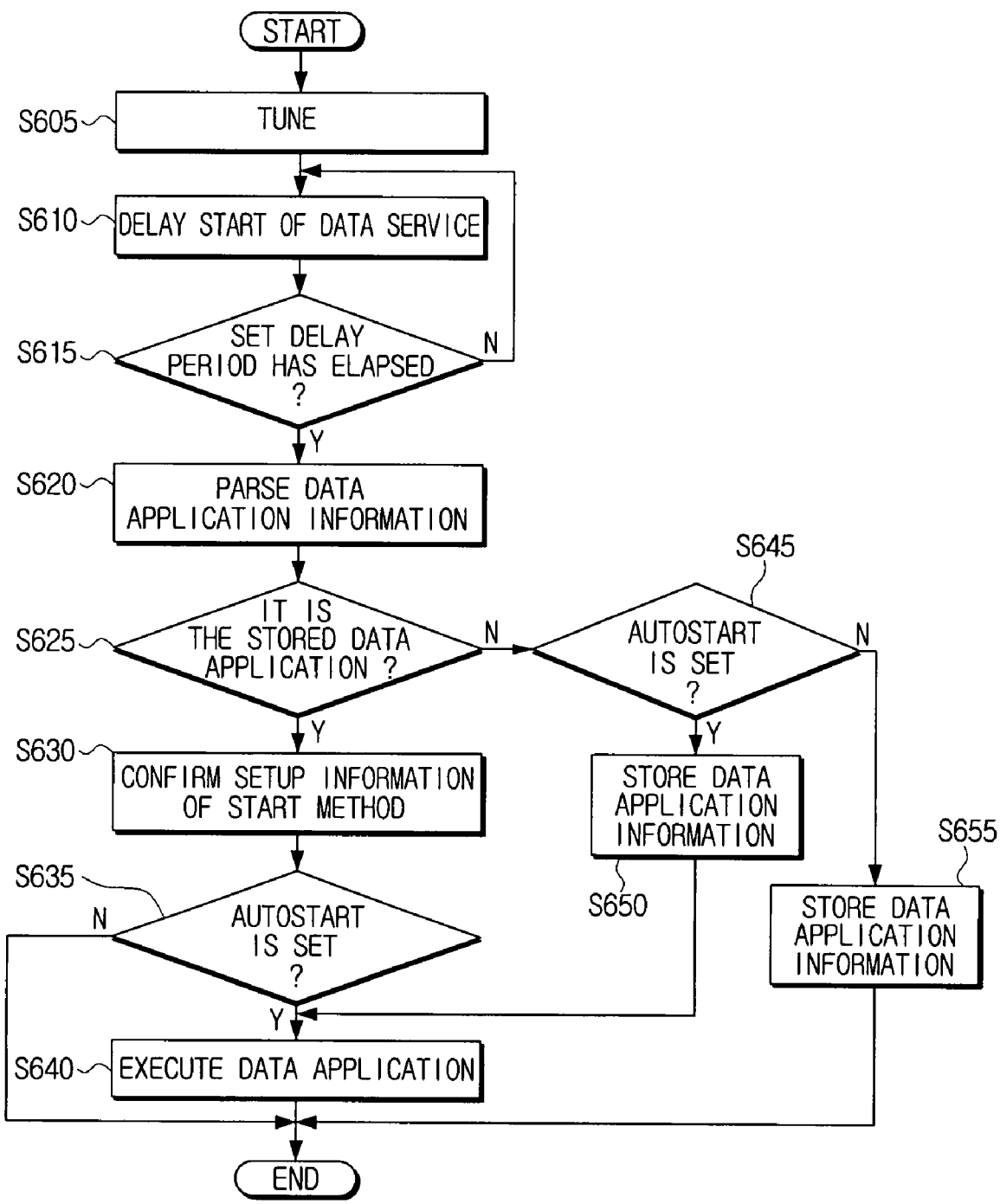
FIG. 6 is a flowchart illustrating a method for controlling an autostart of a data application of a video playback apparatus according to an exemplary embodiment of the present invention.

FIG. 6 is a flowchart illustrating a method for controlling an autostart of a data application of a video playback apparatus according to an exemplary embodiment of the present invention.

In FIG. 6, the tuner 210 tunes the channel selected by the user in operation S605. The controller 270 delays the start of a data service-related data application received on the tuned channel for the set delay period in operation S610. Additionally, the controller 270 determines whether the set delay period has elapsed in operation S615.

If it is determined that the set delay period has elapsed in operation S615-Y, the controller 270 controls the parser 230 to parse the data application information decoded by the MPEG decoder 220 in operation S620.

The controller 270 determines whether the received data application exists in the data application list stored in the storage part 280, based on the data application name contained in the parsed data application information in operation S625.

If it is determined that the received data application exists in the stored data application list in operation S625-Y, the controller 270 confirms the setup information of the start procedure of the received data application from the data application list in operation S630.

The controller 270 determines whether the start procedure of the received data application is set to autostart, based on the setup information of the start procedure in operation S635.

If it is determined that the data application is set to autostart in operation S635-Y, the controller 270 executes the received data application in operation S640.

In operation S625, if it is determined that the received data application does not exist in the stored data application list in operation S625-N, the controller 270 regards the data application as a first received data application, and determines whether the autostart flag contained in the information regarding the received data application is set to autostart in operation S645. If it is determined that the autostart flag is set to autostart in operation S645-Y, the controller 270 stores the information regarding the received data application in the data application list stored in the storage part 280 in operation S650.

Subsequently, the controller 270 executes the received data application in operation S640.

In operation S645, if it is determined that the autostart flag is not set to autostart in operation S645-N, the controller 270 stores the information regarding the received data application in the data application list stored in the storage part 280 in operation S655.

FIG. 7 is a flowchart illustrating a method for controlling an autostart of a data application of a video playback apparatus according to another exemplary embodiment of the present invention.

In FIG. 7, the controller 270 determines the setup information of the start procedure of the stored data application in operation S710.

Subsequently, the controller 270 executes the data application according to the setup information of the start procedure of the data application determined above in operation S720.

As described above, according to exemplary embodiments of the present invention, it is possible to prevent the data application from being automatically started unintentionally. Additionally, control is performed to automatically execute only the required data application, and therefore, user convenience is enhanced and the efficiency of the apparatus also increases.

The foregoing exemplary embodiments and aspects are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for controlling an autostart of a data application, comprising:
    determining stored setup information of a start procedure of the data application; and
    executing the data application according to the determined setup information of the start procedure of the data application,
    wherein the executing comprises executing the data application according to the stored setup information of the start procedure of the data application even though an autostart flag is not present in the data application, and
    wherein the executing comprises not executing the autostart for all data applications received on a selected channel according to the stored setup information of the start procedure of the data application.

2. The method as claimed in claim 1, wherein the executing comprises manually executing or automatically executing the data application according to the stored setup information of the start procedure of the data application.

3. The method as claimed in claim 1, wherein the setup information comprises an autostart flag which specifies whether the autostart is executed.

4. The method as claimed in claim 1, wherein the determining comprises:
    determining whether the data application exists in a previously stored data application list; and
    confirming the stored setup information of the start procedure of the data application based on the previously stored data application list if it is determined that the data application exists in the previously stored data application list.

5. The method as claimed in claim 4, further comprising:
    storing the data application in the previously stored data application list if it is determined that the data application does not exist in the previously stored data application list; and
    executing the data application according to an autostart flag value of the data application.

6. The method as claimed in claim 4, wherein a data application which is not continuously received is deleted from the previously stored data application list.

7. The method as claimed in claim 4, wherein the previously stored data application list is updated if information regarding the data application changes.

8. The method as claimed in claim 1, further comprising delaying an execution of the data application.

9. The method as claimed in claim 8, wherein the delaying comprises not parsing data application information for the execution of the data application, for a set delay period.

10. A video playback apparatus, comprising:
    a receiver which receives a data application on a selected channel; and
    a controller which determines stored setup information of a start procedure of the received data application and executes the received data application according to the determined setup information of the start procedure of the received data application,
    wherein the controller executes the received data application according to the stored setup information of the start procedure of the received data application even though an autostart flag is not present in the received data application, and
    wherein the controller does not execute autostart for all data applications received on the selected channel according to the stored setup information of the start procedure of the received data application.

11. The apparatus as claimed in claim 10, wherein the controller controls so data application information is not parsed for a set delay period.

12. The apparatus as claimed in claim 10, further comprising:
    a decoder which decodes data application information; and
    a parser which parses the decoded data application information.

13. The apparatus as claimed in claim 10, wherein the controller manually executes or automatically executes the received data application according to the stored setup information of the start procedure of the received data application.

14. The apparatus as claimed in claim 10, wherein the controller determines whether the received data application exists in a previously stored data application list, and confirms the stored setup information of the start procedure of the received data application based on the previously stored data application list if it is determined that the received data application exists in the previously stored data application list.

15. The apparatus as claimed in claim 14, wherein the controller stores the received data application in the previously stored data application list if it is determined that the received data application does not exist in the previously stored data application list, and executes the received data application according to an autostart flag value of the received data application.

16. The apparatus as claimed in claim 14, wherein the controller deletes a data application which is not continuously received, from the previously stored data application list.

17. The apparatus as claimed in claim 14, wherein the controller updates the previously stored data application list if information regarding the received data application changes.

18. A video playback apparatus, comprising:
 a receiver which receives a data application on a selected channel;
 a controller which determines stored setup information of a start procedure of the received data application and executes the received data application according to the determined setup information of the start procedure of the received data application;
 a decoder which decodes data application information; and
 a parser which parses the decoded data application information,
 wherein the controller controls the decoder to not output the data application information to the parser for a set delay period, and
 wherein the controller executes the received data application according to the stored setup information of the start procedure of the received data application even though an autostart flag is not present in the received data application and the controller does not execute autostart for all data applications received on the selected channel according to the stored setup information of the start procedure of the received data application.

19. A method for controlling an autostart of a data application, comprising:
 determining stored setup information of a start procedure of the data application;
 executing the data application according to the determined setup information of the start procedure of the data application,
  wherein the executing comprises executing the data application according to the stored setup information of the start procedure of the data application even though an autostart flag is not present in the data application and the executing comprises not executing the autostart for all data applications received on a selected channel according to the stored setup information of the start procedure of the data application; and delaying an execution of the data application,
  wherein the delaying comprises not parsing data application information for the execution of the data application, for a set delay period,
  wherein the delaying the execution of the data application is conducted for a length of time set by a user.

20. A method for controlling an autostart of a data application, the method comprising:
 receiving a data application on a tuned channel;
 determining a delay period for the data application according to stored setup information for the data application;
 parsing the received data application only after passage of the delay period for the data application;
 after parsing the received data application determining whether an autostart is set for the data application; and
 if the autostart is set, executing the data application, and if the autostart is not set, not executing the data application,
 wherein executing the data application comprises not executing the autostart for all data applications received on the tuned channel according to the stored setup information of the start procedure of the data application.

* * * * *